United States Patent Office 3,367,938
Patented Feb. 6, 1968

3,367,938
PROCESS FOR PRODUCING PYRIDINE
Lothar Hockenberger, Ludwigshafen (Rhine), and Hans Binder, Frankfurt am Main-Sud, Germany, assignors to Rutgerswerke und Teerverwertung Aktiengesellschaft, Frankfurt am Main, Germany
No Drawing. Filed Mar. 3, 1965, Ser. No. 436,935
Claims priority, application Germany, Mar. 12, 1964, R 37,433
9 Claims. (Cl. 260—290)

It has been known that dialkylolamines, such as

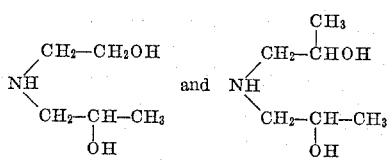

can be converted by the action of high temperatures, such as 275–350° C., in the presence of a hydrogenation-dehydrogenation catalyst into 3-hydroxypyridine and its 5-methylderivative. (See U.S. Patent No. 2,557,076, Chemical Abstracts, 1952, 145b.)

It has now been found that pyridine proper can be prepared by causing to pass diethanolamine in the presence of methanol or its dehydration products, or paraformaldehyde over catalysts which have dehydrogenating and dehydrating action.

The reaction takes place according to the total equation:

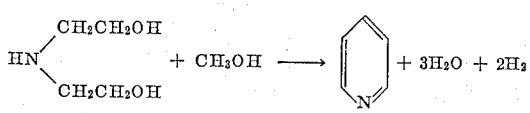

The reaction is carried out in the gaseous phase, by vaporizing a mixture of diethanolamine and methanol in the molecular proportion corresponding to 1:2 up to 1:8 in an evaporator and cause the mixture to pass through a reactor.

The entire reaction is catalyzed by the compounds vanadium oxide, molybdenum oxide, thorium oxide, and zinc oxide, which are applied to carriers, such as aluminum oxide or silica gel with a content of 10–50%.

Combination of these catalysts can likewise be used. The reaction can be carried out also with nitrogen as a carrier or diluting medium. The reaction temperature should be in the range between 400 and 550° C., the space velocity is at 1 to 5/h. (The space velocity is defined as volume unit liquid per hour and volume unit catalyst.) In the reaction with $CH_2O$, the space velocity amounts likewise to 1 to 5/h. The mixing proportion diethylamine to paraformaldehyde is 1:2 at temperatures between 280° and 450° C. In this case, too, nitrogen can be used as carrier and diluting gas. The catalysts are the same as mentioned above; they can be regenerated by passing air at 500° C. over them. An advantage of this invention consists in that without feeding gas, for example ammonia, only the mixture, which can be easily handled, and is already present in the storage container, is introduced into a vaporizer over a dosing pump. Therefore, this process can be carried out without the use of mixing devices, one or more gas containers, and preheaters for gas. Moreover, the difficult reconduction of excess ammonia, which is necessary in other processes, is unnecessary here.

*Preparation of a vanadium-molybdenum catalyst*

To 25 g. of ammonium molybdate dissolved in 500 ml. of distilled water 50 ml. of ammonium hydroxide are added. Subsequently, in the mixture which has a temperature of 90° C., 32 g. of ammonium vanadate are dissolved.

The hot solution is then poured on activated granulated aluminum oxide and the entire mixture is evaporated to dryness at 150° C. Subsequently the catalyst is caused to glow for 20–24 hours at 500° C. in a muffle furnace.

EXAMPLE 1

A mixture of diethanolamine and methanol in the proportion 1:3 is conducted in the gaseous phase at 500° C. through the reactor. The catalyst of this example consists of a mixture of vanadium oxide and molybdenum oxide on aluminum oxide carrier. The space velocity amounts to 3. The reaction products are condensed and recovered at the end of the reaction. After drying by circulation with benzene, fractional distillation over a column is carried out. The yield of pyridine amounts to 20% of the theory, based on reacted diethanolamine. In addition 7% of a mixture of α-picoline and β-picoline are formed. 30% of the diethanolamine charged, are recovered.

EXAMPLE 2

Diethanolamine and methanol mixed in a proportion of 1:5, are reacted at 520° C. over vanadium oxide and aluminum oxide in the gaseous phase and the mixture is diluted with nitrogen. The space velocity amounts to 2.5. After drying, as in Example 1, in the fractional distillation 42% of pyridine, calculated on reacted diethanolamine, are obtained. In addition, 10% of α-picoline and β-picoline mixtures are formed.

EXAMPLE 3

Paraformaldehyde is dissolved in the proportion of 2:1 in diethanolamine and the mixture is reacted at 300° C. over vanadium oxide/molybdenum oxide on aluminum oxide. At a space velocity of 1, 13.5% pyridine can be recovered.

EXAMPLE 4

A solution of paraformaldehyde in diethanolamine in the proportion of 2:1 is vaporized and passed in the reactor at 300° C. over molybdenum oxide and vanadium oxide on $Al_2O_3$. The space velocity amounts to 2.5. After drying and fractional distillation, the yield of pyridine amounts to 37% calculated on reacted diethanolamine. 30% of the diethanolamine charged are recovered.

EXAMPLE 5

Diethanolamine is reacted with a 40% formaldehyde solution in a mol proportion of 1:1 at 500° C. in a reactor, nitrogen being used as diluting gas. The catalyst consists of 10% vanadium oxide on activated aluminum oxide. After reaction, the unreacted diethanolamine (15%) is separated, the pyridine-containing fraction is dried over sodium hydroxide and then distilled. Thereby 12% of pyridine, and 8% of a mixture of α- and β-picoline, are obtained, calculated on the reacted diethanolamine.

It will be understood from the above that this invention is not limited to the specific details described above and can be carried out with various modifications. The ammonium hydroxide used in the preparation of the vanadium-molybdenum catalyst is preferably an aqueous solution containing 25% $H_4NOH$. The resulting hot solution poured on 250 g. granulated aluminum oxide and evaporated to dryness, yields after glowing at 500° C. 290 g. catalyst which contains about 12 g. vanadium oxide and 31 g. molybdenum oxide.

The proportions mentioned in the above examples are molecular proportions in each case.

The catalysts used in the above examples contained the following ingredients:

Example:
1.—Vanadium oxide 4% by weight; Molybdenum oxide 10% by weight.
2.—Vanadium oxide 25% by weight.
3.—Vanadium oxide 4% by weight; Molybdenum oxide 10% by weight.
4.—Vanadium oxide 4% by weight; Molybdenum 10% by weight.
5.—Vanadium oxide 10% by weight.

In using dilution by nitrogen in the examples, 5 to 15% by volume nitrogen can be applied.

What is claimed is:

1. Process for producing pyridine, comprising mixing diethanolamine with a compound selected from the group consisting of methylalcohol, formaldehyde and formaldehyde polymers and reacting the resulting mixture in the gaseous phase at a temperature in the range of 400 to 550° C. in the presence of catalysts having dehydrogenating and dehydrating action and being selected from the group consisting of vanadium oxide, molybdenum oxide, thorium oxide and zinc oxide.

2. A process as claimed in claim 1, in which a mixture of diethanolamine and methanol is reacted in the molecular proportion of 1:2 up to 1:8.

3. A process as claimed in claim 1, in which the catalyst contains silica gel.

4. A process as claimed in claim 1, in which the catalyst contains molybdenum oxide and vanadium oxide, on granulated aluminum oxide.

5. A process as claimed in claim 1, in which the reaction is carried out in the gaseous phase diluted with gaseous nitrogen.

6. A process as claimed in claim 2, in which 1 mol diethanolamine is reacted with 3 mols of methylalcohol at 500° C.

7. A process as claimed in claim 6, in which 1 mol diethanolamine is reacted with 5 mols methanol at 520° C.

8. A process as claimed in claim 1, in which 1 mol diethanolamine is reacted with 2 mols of paraformaldehyde at 300° C.

9. A process as claimed in claim 1, in which 1 mol diethanolamine is reacted with 1 mol of aqueous 40% formaldehyde solution in the vapor phase at 500° C.

References Cited

UNITED STATES PATENTS 2,557,076   6/1951   Chitwood _____ 260—297

JOHN D. RANDOLPH, *Primary Examiner.*

C. M. SHURKO, *Assistant Examiner.*